(12) United States Patent
Tomiyama

(10) Patent No.: US 7,222,706 B2
(45) Date of Patent: May 29, 2007

(54) LOCKUP DEVICE FOR HYDRAULIC TORQUE TRANSMISSION DEVICE

(75) Inventor: Naoki Tomiyama, Hirakata (JP)

(73) Assignee: Exedy Corporation, Osaka (JP)

( * ) Notice: Subject to any disclaimer, the term of this patent is extended or adjusted under 35 U.S.C. 154(b) by 160 days.

(21) Appl. No.: 11/074,873

(22) Filed: Mar. 9, 2005

(65) Prior Publication Data

US 2005/0211521 A1 Sep. 29, 2005

(30) Foreign Application Priority Data

Mar. 23, 2004 (JP) ............................. 2004-084860

(51) Int. Cl.
*F16H 45/02* (2006.01)

(52) U.S. Cl. .................... 192/3.29; 192/3.33

(58) Field of Classification Search ...................... None
See application file for complete search history.

(56) References Cited

U.S. PATENT DOCUMENTS

| | | | | |
|---|---|---|---|---|
| 4,926,988 A | * | 5/1990 | Kundermann | 192/3.3 |
| 5,462,145 A | * | 10/1995 | Gimmler | 192/3.29 |
| 5,799,763 A | * | 9/1998 | Dehrmann | 192/3.29 |
| 5,829,561 A | | 11/1998 | Arhab | |
| 2001/0011621 A1 | * | 8/2001 | Bauer et al. | 192/3.29 |
| 2001/0013454 A1 | * | 8/2001 | Yamamoto | 192/3.29 |
| 2003/0178275 A1 | * | 9/2003 | Breier et al. | 192/3.29 |
| 2003/0183469 A1 | * | 10/2003 | Bauer et al. | 192/3.29 |

FOREIGN PATENT DOCUMENTS

| | | |
|---|---|---|
| JP | 09-112651 | 5/1997 |
| JP | 2002-195378 A * | 7/2002 |
| JP | 2002-195380 A * | 7/2002 |

* cited by examiner

*Primary Examiner*—Rodney H. Bonck
(74) *Attorney, Agent, or Firm*—Global IP Counselors, LLP

(57) ABSTRACT

In a lockup device, a drive plate has a frictional coupling portion adjacent to a friction surface, and can provide torque to a turbine. The piston is a disk-like member arranged between a front cover and the turbine, has a pressing portion arranged on a side of the frictional coupling portion remote from a friction surface, and is axially movable according to a change in hydraulic pressure. The piston coupling mechanism unrotatably and axially movably couples the piston to the front cover. A seal mechanism seals a portion radially inside the piston at its axially opposite sides. The damper mechanism is arranged in a space axially between the front cover and the turbine, and is located radially between a drive plate and a seal mechanism. The piston coupling mechanism is arranged radially inside the seal mechanism.

22 Claims, 8 Drawing Sheets

LOCKUP DEVICE FOR HYDRAULIC TORQUE TRANSMISSION DEVICE

BACKGROUND OF THE INVENTION

1. Field of the Invention

The present invention generally relates to a lockup device of a hydraulic torque transmission device. More specifically, the present invention relates to a lockup device having a multi-face clutch, in which a piston presses a friction plate to a friction surface of a front cover.

2. Background Information

A torque converter is a device for transmitting a torque of an engine to a transmission side via an internal working fluid, and primarily includes a front cover receiving torque from an engine, an impeller fixed to a transmission-side portion of a front cover to form a fluid chamber, a turbine opposed to an engine-side portion of the impeller for providing torque to a transmission side, and a stator arranged between radially inner portions of the impeller and the turbine for rectifying the working fluid flowing from the turbine toward the impeller.

The lockup device is a device arranged in a space between the turbine and the front cover for mechanically coupling the front cover and the turbine together, and thereby directly transmitting the torque from the front cover to the turbine. The lockup device includes a disk-like piston, which can be pressed to a friction surface of the front cover for coupling, and an elastic coupling mechanism for transmitting the torque between the piston and the turbine.

A lockup device which includes two friction surfaces for increasing a torque transmission capacity has already been proposed. For example, this lockup device includes a clutch mechanism having a frictional coupling portion opposed to a friction surface of a front cover, a piston for pressing the frictional coupling portion to the front cover, and an elastic coupling mechanism elastically coupling the turbine and the clutch mechanism fixed to the turbine together in the rotating direction (e.g., see Japanese Laid-Open Patent Publication No. H9-112651).

More specifically, the clutch mechanism includes a friction plate having a frictional coupling portion adjacent to the friction surface of the front cover, and a piston which has a pressing portion adjacent to the frictional coupling portion, and can be axially moved by a hydraulic pressure. The piston is coupled to the front cover via return plates formed of plate springs. Owing to this coupling, the piston rotates together with the front cover, and is moved away the front cover by an elastic force of the return plates when the clutch is released. The elastic coupling mechanism includes a plurality of springs each having circumferential ends supported by the friction plate, and a driven plate supporting the circumferential ends of the springs fixed to the turbine.

The prior art, in which the mechanism coupling the front cover to the piston is formed with return springs that are made of plate springs, requires members such as rivets or bolts for fixing the opposite ends of each return spring. This increase the number of required parts, and complicates the structure so that the weight of the structure increases. Furthermore, the number of manufacturing steps increases.

In addition, the piston coupling mechanism is arranged in a radially middle portion of an axial space between the front cover and the turbine. Therefore, sufficient space cannot be ensured for the spring members of the damper mechanism. Consequently, it is impossible to increase the sizes of the spring members, and thus impossible to increase the vibration absorbing properties without difficulty.

In view of the above, it will be apparent to those skilled in the art from this disclosure that there exists a need for an improved lockup device having a piston for pressing a frictional coupling portion of a friction plate to a front cover, and particularly to simplify a mechanism for coupling the piston to the front cover. In addition, it is also apparent to those skilled in the art that there exists a need for an improved lockup device having a piston for pressing a frictional coupling portion of a friction plate to a front cover, and particularly to ensure a space for a spring member of a damper mechanism. This invention addresses these needs in the art as well as other needs, which will become apparent to those skilled in the art from this disclosure.

SUMMARY OF THE INVENTION

According to a first aspect of the present invention, a lockup device is used in a hydraulic torque transmission device having a front cover having a friction surface, an impeller fixed to the front cover to define a fluid chamber filled with a working fluid, and a turbine arranged in the fluid chamber and opposed to the impeller. The lockup device includes a friction plate, a piston, a piston coupling mechanism, a seal mechanism and a damper mechanism. The friction plate has a frictional coupling portion adjacent to the friction surface, and being capable of providing a torque to the turbine. The piston is a disk-like member arranged between the front cover and the turbine, has a pressing portion arranged on a side of the frictional coupling portion remote from the friction surface, and is axially movable in response to a change in hydraulic pressure. The piston coupling mechanism unrotatably and axially movably couples the piston to the front cover. The seal mechanism seals a portion radially inside the piston at its axially opposite sides. The damper mechanism is arranged in an axial space between the front cover and the turbine, and is located radially between the friction plate and the seal mechanism. The piston coupling mechanism is arranged radially inside the seal mechanism.

According to this lockup device, the piston axially moves in response to the change in hydraulic pressure. Thereby, the piston presses the frictional coupling portion of the friction plate to the friction surface of the front cover to engage the clutch, or is spaced therefrom to disengage the clutch. Since the piston coupling mechanism is arranged radially inside the seal mechanism, a large space can be ensured radially outside the seal mechanism so that the damper mechanism can employ large spring members.

According to a second aspect of the present invention, the piston coupling mechanism of the lockup device of the first aspect has a plurality of circumferentially spaced projections that engage with each other. This lockup device has a simple structure because the piston coupling mechanism is formed of the plurality of projections.

According to a third aspect of the present invention, the piston coupling mechanism of the lockup device of the first or second aspects forms a working fluid moving passage opening into a space between the front cover and the piston. In this lockup device, the number of parts can be reduced because the piston coupling mechanism also serves as the oil passage.

According to a fourth aspect of the present invention, the piston coupling mechanism of the lockup device of the first aspect is formed of an engagement member that is a disk-like member rotating together with the front cover, and provided with a plurality of circumferentially spaced projections and a plurality of engagement projections projecting from a radially inner periphery of the piston, and engages with the plurality of projections. In this lockup device, the structure can be simplified because the engagement member and the piston are engaged with each other via the projections.

According to a fifth aspect of the present invention, the engagement member of the lockup device according to the fourth aspect is formed of a disk-like body located in a position axially shifted from a radially inner portion of the front cover toward the turbine, and the projection axially projecting from the body toward the front cover.

According to a sixth aspect of the present invention, the seal mechanism of the lockup device according to the fourth or fifth aspects is arranged on a radially outer circumferential surface of the engagement member.

According to a seventh aspect of the present invention, the seal mechanism of the lockup device of the sixth aspect has a cylindrical member fixed to a radially inner portion of the piston, and is axially slidable on a radially outer circumferential surface of the support member.

According to an eighth aspect of the present invention, the lockup device of the first aspect further includes a center boss fixed to a radially inner periphery of the front cover. The piston coupling mechanism is formed of a plurality of circumferentially spaced projections arranged on the center boss, and a plurality of engagement projections projecting from a radially inner periphery of the piston and engaged with the plurality of projections.

In this lockup device, the piston axially moves in response to the change in hydraulic pressure. Thereby, the piston presses the frictional coupling portion of the friction plate to the friction surface of the front cover to engage the clutch, or is spaced therefrom to disengage the clutch.

According to a ninth aspect of the present invention, the plurality of projections of the lockup device according to the eighth aspect are in contact with a surface on a turbine side of a radially inner portion of the front cover.

According to a tenth aspect of the present invention, a radially outer portion of the center boss of the lockup device according to the eighth or ninth aspects is provided at a portion radially inside the plurality of projections with a working fluid supply passage opening into a portion between the plurality of projections.

According to an eleventh aspect of the present invention, the piston coupling mechanism of the lockup device according to any of the eighth to tenth aspects further includes a support member radially supporting the piston.

According to a twelfth aspect of the present invention, the support member of the lockup device according to the eleventh aspect is axially located on the turbine side with respect to the plurality of projections.

According to a thirteenth aspect of the present invention, the support member of the lockup device according to the twelfth aspect is fixed to the plurality of projections.

According to a fourteenth aspect of the present invention, the seal mechanism of the lockup device according to any one of the eleventh to thirteenth aspects is arranged on a radially outer circumferential surface of the support member.

According to a fifteenth aspect of the present invention, the seal mechanism of the fourteenth aspect has a cylindrical portion fixed to a radially inner portion of the piston and is axially slidable with respect to a radially outer circumferential surface of the support member.

According to sixteenth aspect of the present invention, a lockup device for use in a hydraulic torque transmission device includes a front cover having a friction surface, an impeller fixed to the front cover to define a fluid chamber filled with a working fluid, and a turbine arranged in the fluid chamber and opposed to the impeller. The lockup device includes a friction plate, a piston, a piston coupling mechanism, a seal mechanism and a damper mechanism. The friction plate has a frictional coupling portion adjacent to the friction surface, and being capable of providing a torque to the turbine. The piston is a disk-like member arranged between the front cover and the turbine, has a pressing portion arranged on a side of the frictional coupling portion remote from the friction surface, and is axially movable in response to a change in hydraulic pressure. The piston coupling mechanism unrotatably and axially movably couples the piston to the front cover. The seal mechanism seals a portion radially inside the piston at its axially opposite sides. The damper mechanism is arranged in an axial space between the front cover and the turbine, and is arranged radially between the friction plate and the seal mechanism. The piston coupling mechanism has a plurality of circumferentially spaced projections engaging with each other.

According to this lockup device, the piston axially moves in response to the change in hydraulic pressure. Thereby, the piston presses the frictional coupling portion of the friction plate to the friction surface of the front cover to engage the clutch, or is spaced therefrom to disengage the clutch. This lockup device has a simple structure because the piston coupling mechanism is formed of the plurality of projections.

According to a seventeenth aspect of the present invention, the piston coupling mechanism according to the sixteenth aspect forms a passage opening into a space between the front cover and the piston for moving the working fluid. Because the piston coupling mechanism also serves as the oil passage, the number of parts can be reduced.

According to an eighteenth aspect of the present invention, the piston coupling mechanism of the lockup device according to the sixteenth or seventeenth aspects, the piston coupling mechanism is formed of a disk-like engagement member that rotates together with the front cover and has one of said circumferentially spaced projections, and the other of the circumferentially spaced projections that project radially inward from a radially inner periphery of the piston.

According to a nineteenth aspect of the present invention, the engagement member according to the eighteenth aspect is formed of a disk-like body located in a position axially shifted from a radially inner portion of the front cover toward the turbine, and a projection axially projecting from the body toward the front cover.

According to a twentieth aspect of the present invention, the lockup device according to the sixteenth or seventeenth aspects further includes a center boss fixed to a radially inner periphery of the front cover. The piston coupling mechanism is formed of one of the plurality of circumferentially spaced projections provided on the center boss, and the other of the plurality of circumferentially spaced projections that project radially inward from a radially inner periphery of the piston.

According to a twenty first aspect of the present invention, the plurality of projections of the center boss of the lockup device according to the twentieth aspect are in contact with a surface on a turbine side of a radially inner portion of the front cover.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

A first embodiment of the invention will now be described with reference to the drawings.

(1) Overall Structure of a Torque Converter

Figure 1:
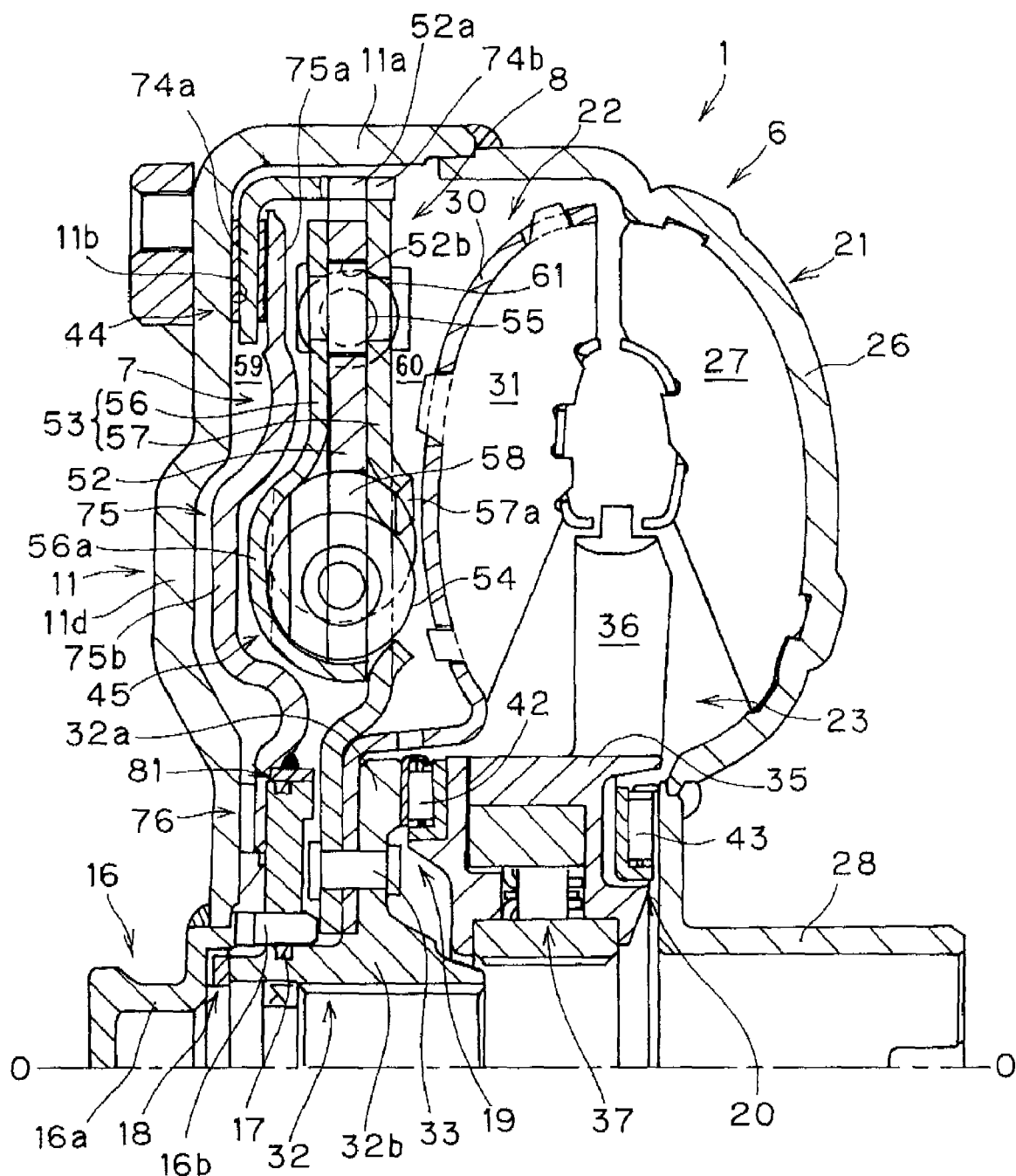
FIG. 1 is a schematic cross section of a torque converter employing an embodiment of the invention.
Figure 2:
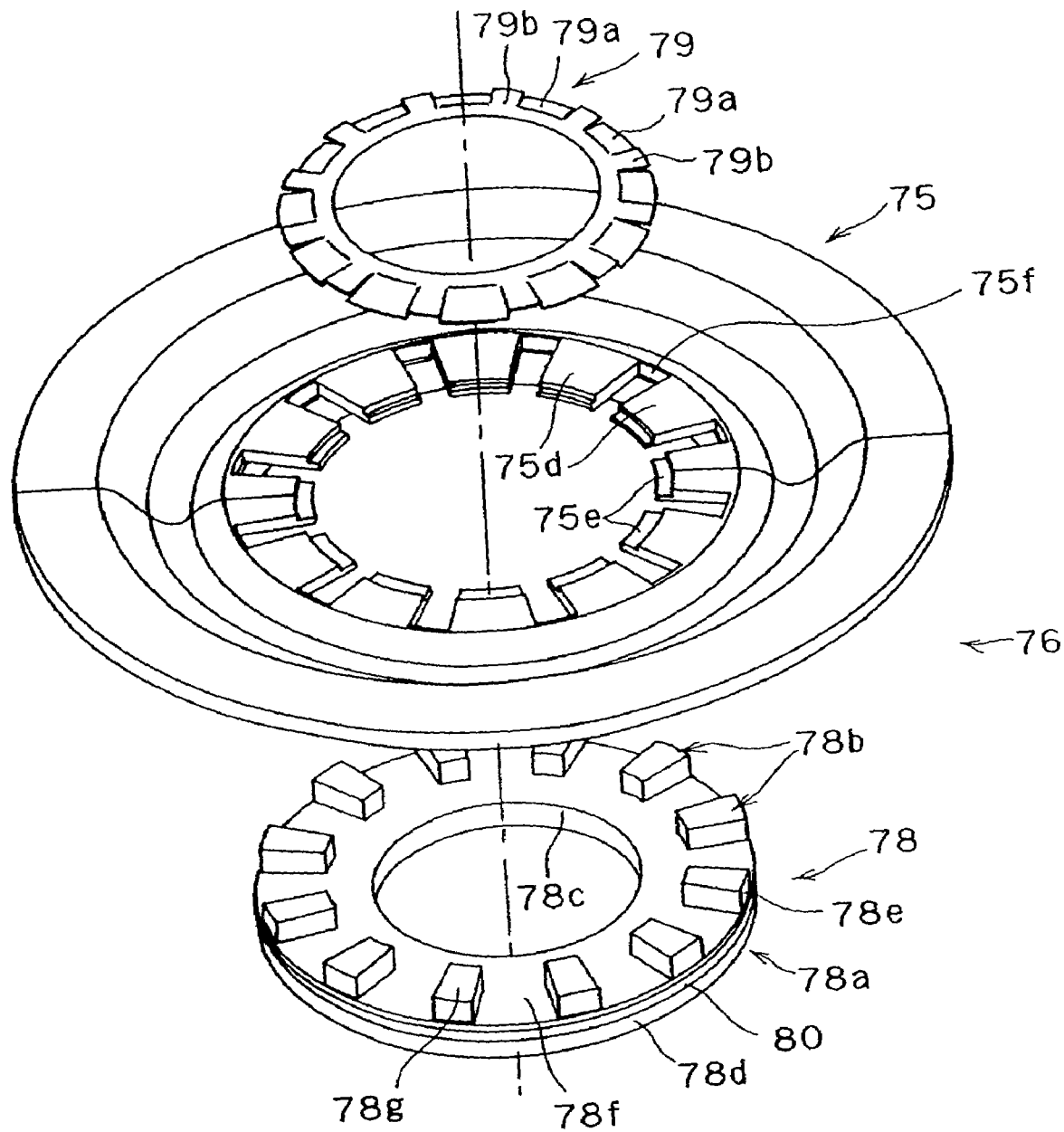
FIG. 2 shows the outer appearances of various members of a piston coupling mechanism.

FIG. 1 is a schematic cross section of a torque converter 1 employing an embodiment of the invention. The torque converter 1 is a device for transmitting a torque from a crankshaft (not shown) of an engine to an input shaft (not shown) of a transmission. Although not shown, the engine is arranged on a left side in FIG. 1, and the transmission is arranged on the right side in FIG. 1. In FIG. 1, O—O indicates a rotation axis of the torque converter 1.

The torque converter 1 is primarily coupled to the crankshaft via a flexible plate (not shown). The flexible plate is formed of a thin disk-like member, and can transmit torque while absorbing being vibrations transmitted from the crank shaft to the torque converter 1. Therefore, the flexible plate has a rigidity that is sufficient to transmit the torque in a rotating direction, but has a low rigidity in a bending direction. A radially inner portion of the flexible plate is fixed to the crankshaft by crank bolts.

The torque converter 1 primarily includes a fluid working chamber 6 formed of three kinds of vane wheels (i.e., an impeller 21, a turbine 22 and a stator 23), and also includes a lockup device 7.

A front cover 11 is a disk-like member, and a radially outer portion of the flexible plate is fixed thereto. A center boss 16, which is a substantially cylindrical member and extends axially, is fixed to a radially inner portion 11e of the front cover 11 by welding or the like. The center boss 16 has a crankshaft-side cylindrical portion 16a fitted into a central aperture of the crankshaft, and a turbine-side cylindrical portion 16b extending toward the turbine. A welded portion 13 is formed between the radially outer circumferential surface of the center boss 16 and a radially inner periphery 11f of the front cover 11. The front cover 11 is provided at its radially outer portion with an outer cylindrical portion 11a extending toward the transmission. The end of the outer cylindrical portion 11a is fixed to a radially outer periphery of an impeller shell 26 of the impeller 21 by welding or the like. The front cover 11 and the impeller 21 form a fluid chamber filled with a working fluid.

The impeller 21 is primarily formed of the impeller shell 26, a plurality of impeller blades 27 fixed to the inner side of the impeller shell 26, and an impeller hub 28 fixed to a radially inner portion of the impeller shell 26 by welding or the like.

The turbine 22 is arranged in the fluid chamber, and is axially opposed to the impeller 21. The turbine 22 is primarily formed of a turbine shell 30, a plurality of turbine blades 31 fixed to a surface of the turbine shell 30 opposed to the impeller 21, and a turbine hub 32 fixed to the radially inner periphery of the turbine shell 30. The turbine hub 32 is formed of a flange portion 32a and a boss portion 32. The turbine shell 30 is fixed to the flange portion 32a of the turbine hub 32 together with a second driven plate 57, which will be described later, by a plurality of rivets 33. The turbine hub 32 is provided at a radially inner circumferential surface of the boss portion 32b with a spline engaged with the input shaft (not shown) of the transmission. Thereby, the turbine hub 32 can rotate together with the input shaft (not shown). A radially outer circumferential surface of a portion of the boss portion 32b opposed to the front cover is slidably fitted to a radially inner circumferential surface of the turbine-side cylindrical portion 16b of the center boss 16 with a seal ring 17 therebetween.

The stator 23 is arranged axially between the radially inner portions of the impeller 21 and turbine 22 for rectifying a flow of the working fluid returning from the turbine 22 to the impeller 21. The stator 23 is a molded member made of resin, aluminum alloy or the like, and is primarily formed of an annular stator carrier 35, and a plurality of stator blades 36 arranged on the radially outer circumferential surface of the stator carrier 35. The stator carrier 35 is supported by a fixed cylindrical shaft (not shown) via a one-way clutch 37.

Figure 3:
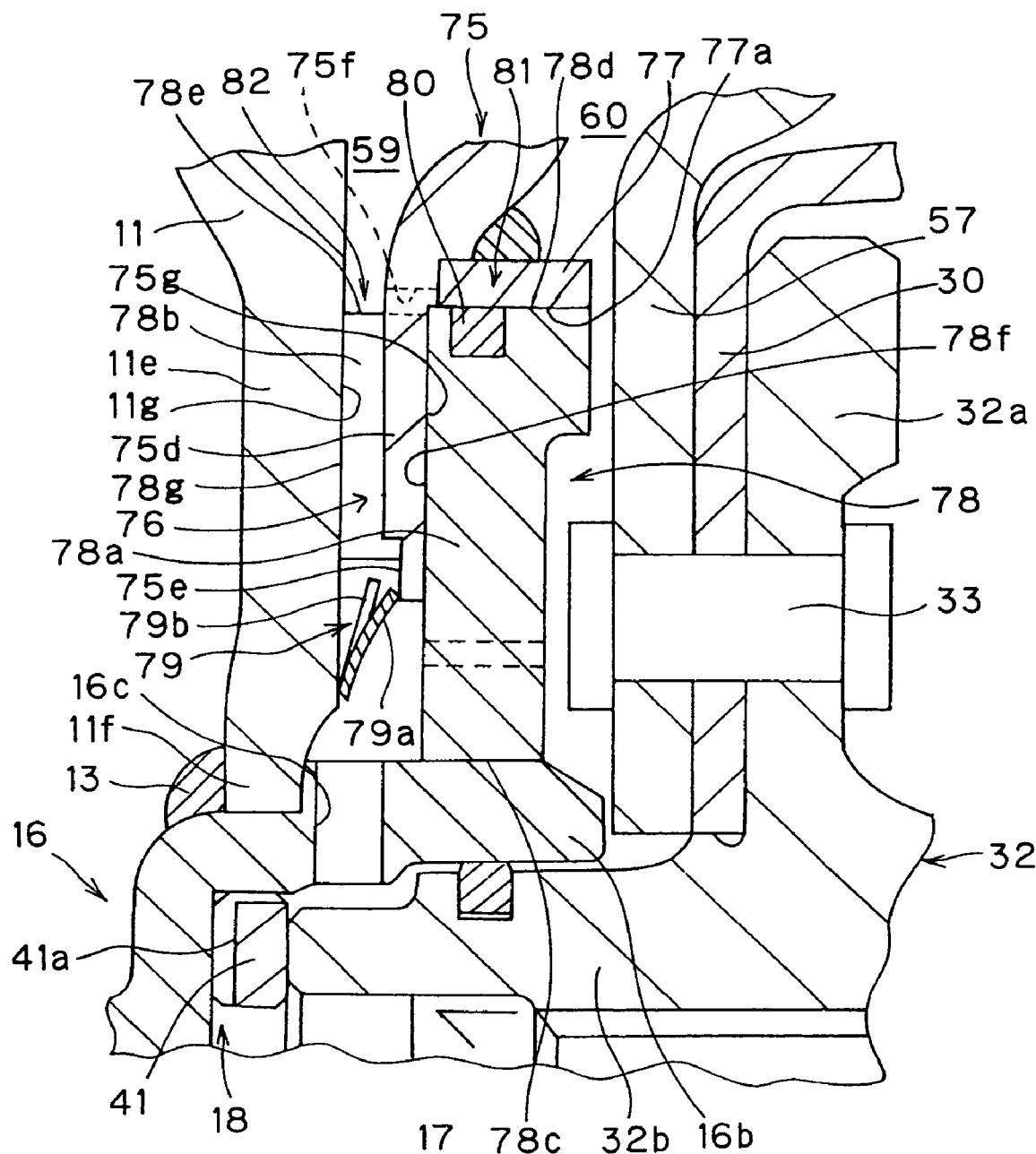
FIG. 3 shows, on an enlarged scale, a portion of the structure in FIG. 1 and illustrates the piston coupling mechanism in a lockup-released state.
Figure 4:
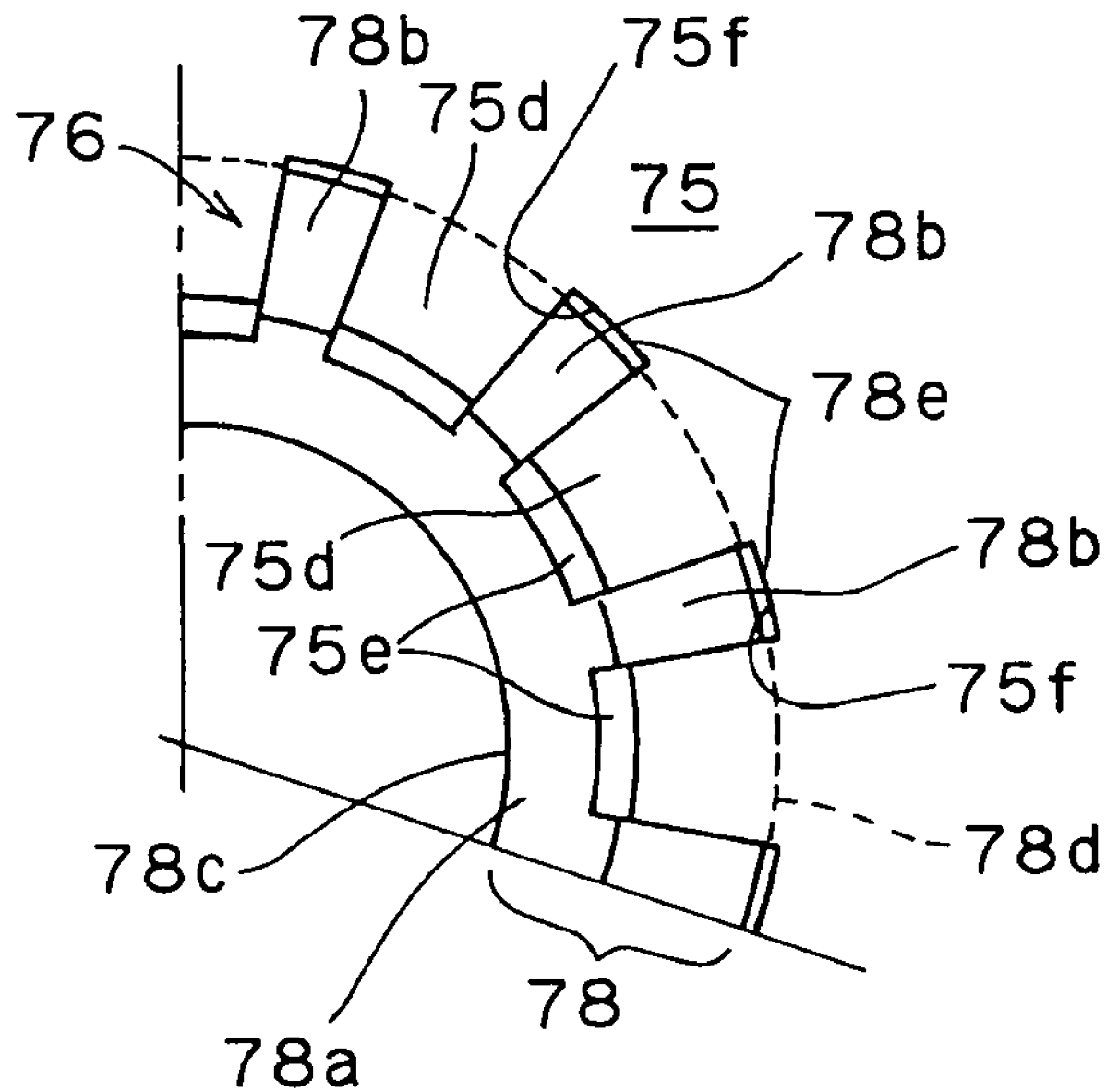
FIG. 4 is a fragmentary plan view of the piston coupling mechanism.

As shown in FIG. 3, the turbine-side cylindrical portion 16b of the center boss 16 is provided with an oil passage 16c for radially carrying the working fluid. A washer 41 functioning as a first thrust bearing is arranged axially between the center boss 16 and the turbine hub 32 for receiving a thrust caused by rotation of the turbine 22. The washer 41 is provided with a plurality of grooves 41a extending radially through the washer 41. These grooves 41a form a first port 18 carrying the working fluid between the radially opposite ends. A second thrust bearing 42 is arranged between the turbine hub 32 and a radially inner portion (specifically, the one-way clutch 37) of the stator 23. A second port 19 carrying the working fluid between the radially opposite ends is formed in a portion, where the second thrust bearing 42 is arranged. Further, a third thrust bearing 43 is arranged axially between the stator 23 (specifically, the stator carrier 35) and the impeller 21 (specifically, the impeller hub 28). A third port 20 carrying the working fluid between the radially opposite ends is formed in a portion, where the third thrust bearing 43 is arranged. The ports 18 to 20 are connected to a hydraulic circuit (not shown), and each can supply and discharge the working fluid independently of the others.

(2) Structure of Lockup Device

The lockup device 7 is arranged in a space 8 between the turbine 22 and the front cover 11 for mechanically coupling them together when necessary. The lockup device 7 is primarily formed of a clutch mechanism 44 and a damper mechanism 45. In the following description of the lockup device 7, the left side in FIGS. 1, 3 and 5 will be referred to as a "front cover side" in the axial position, and the right side will be referred to as a "turbine side" in the axial position.

(2-1) Clutch Mechanism

The clutch mechanism 44 is formed of a drive plate 74, a piston 75 and a piston coupling mechanism 76. The drive plate 74 is an annular plate member, and has an annular frictional coupling portion 74a adjacent to a friction surface 11b of the front cover 11 and a plurality of claws 74b extending from the radially outer end of the frictional coupling portion 74a toward the turbine. Friction facings are fixed to the opposite surfaces of the frictional coupling portion 74a, respectively. The claws 74b are configured to transmit the torque to the damper mechanism 45, which will be described later.

The piston 75 is a disk-like member having a central aperture. The piston 75 neighbors to the front cover 11. The piston 75 divides the space 8 into two axially opposite spaces, i.e., a first space 59 formed between the piston 75 and the front cover 11 as well as a second space 60 formed between the piston 75 and the turbine 22. The radially outer portion of the piston 75 forms a pressing portion 75a. The pressing portion 75a is an annular portion, which has a flat surface on its front cover side, and is arranged on the turbine side of the frictional coupling portion 74a of the drive plate 74. Therefore, when the piston 75 moves toward the front cover, the pressing portion 75a presses the frictional coupling portion 74a to the friction surface 11b of the front cover 11.

The piston coupling mechanism 76 functions to couple the piston 75 to the front cover 11 for integral rotation while allowing axial movement within a predetermined range. The piston coupling mechanism 76 is formed of a piston support 78 and a portion of the piston 75.

The piston support 78 has an annular disk-like body 78a, which is axially spaced from a radially innermost portion 11e of the front cover 11, and is fixed to a radially outer circumferential surface of the turbine-side cylindrical portion 16b of the center boss 16 by welding or the like. A radially inner circumferential surface 78c of the body 78a is fixed to the radially outer circumferential surface of the turbine-side cylindrical portion 16b by welding or the like. The piston support 78 has a plurality of projections 78b, which extend from the surface on the engine side of the radially outer portion of the body 78a toward the front cover. The projections 78b are circumferentially equally spaced from each other. Each projection 78b has an end surface 78g (i.e., the surface on the front cover side) which is in contact with a surface 11g on the transmission side of the front cover 11. The spaces formed circumferentially between the projections 78b form oil grooves (i.e., a passage), through which the working fluid can move radially.

The piston 75 is provided at its radially inner periphery with a plurality of engagement projections 75d extending radially inward. The engagement projections 75d are engaged with the projections 78b so that the piston 75 is non-rotatable and axially movable with respect to the piston support 78, and therefore to the center boss 16 and the front cover 11. Each surface 75f located between radially outer ends of the engagement projections 75d of the piston 75 is located radially outside a radially outer surface 78e of the projection 78b.

A cylindrical member 77 is fixed to a portion of the piston 75 near its radially inner periphery. The cylindrical member 77 axially extends toward the turbine, and has a radially inner circumferential surface 77a in contact with a radially outer circumferential surface 78d of the piston support 78. A seal ring 80 is arranged on the radially outer circumferential surface 78d of the body 78a of the piston support 78 for preventing flow of the working fluid between the first and second spaces 59 and 60 through the piston 75. As described above, a seal mechanism 81 is formed between the piston support 78 and the cylindrical member 77.

As described above, the piston coupling mechanism 76 is formed by engagement of the projections formed by utilizing the oil passage in the piston support 78, and is arranged radially inside the seal mechanism 81. Thus, the piston coupling mechanism 76 does not have a portion arranged radially outside the seal mechanism 81. Therefore, any member other than the piston 75 is not arranged in a radial position of a torsion spring 54 of the damper mechanism 45. This increases space for the torsion springs 54, and thus the torsion springs 54 can have large coil diameters.

A return spring 79 is an elastic member for axially biasing the piston 75 away from the front cover 11, i.e., toward the turbine. The return spring 79 is arranged in a space radially inside the piston coupling mechanism 76, i.e., a space between the radially innermost portion of the front cover 11 and the radially inner portion of the piston support 78. The return spring 79 has a radially outer end in contact with ends 75e of the engagement projections 75d of the piston 75, and also has a radially inner end in contact with the front cover 11. The end 75e has an axially concave form, and has a smaller thickness than the other portions.

The return spring 79 is provided at its radially outer portion with first portions 79a in contact with the ends 75e as well as second portions 79b, which are partially cut from the first portions 79a and bent axially toward the engine and extend away from the ends 75e. These first and second portions 79a and 79b are circumferentially alternately arranged. The second portions 79b allow radial movement of the working fluid around the return spring 79. According to the above structures, the working fluid can be supplied and discharged into/from the space 59 via an oil passage 82, the portion around the return spring 79, the oil passage 16c and the first port 18.

The piston support 78 described above functions to engage with the piston 75 to transmit the torque to the piston 75, functions to stop the axial movement of the piston 75 toward the turbine, functions to ensure an oil passage to the front cover 11, functions to radially position the piston 75 and functions to form the seal mechanism 81 with respect to the piston 75.

(2-2) Damper Mechanism

The damper mechanism 45 is formed of a drive member 52, a driven member 53 and the plurality of torsion springs 54. The drive member 52 is a disk-like member. The drive member 52 is provided at its radially outer periphery with a plurality of projections 52a, which extend radially for engagement with the claws 74b of the drive plate 74. Owing to this engagement, the drive plate 74 and the drive member 52 are axially movable with respect to each other, but rotate together in the rotating direction. The drive member 52 is provided with a plurality of circumferentially spaced windows 58. Each window 58 is a circumferentially long aperture or opening. The driven member 53 is formed of a pair of plate members 56 and 57, which are axially aligned to each other. The radially outer portions of the paired plate members 56 and 57 are fixed together by a plurality of rivets 55. Each rivet 55 extends through a circumferentially long aperture 52b formed in the drive member 52. The second plate member 57 has the radially inner portion fixed to the flange portion 32a of the turbine hub 32 by the plurality of rivets 33. The plate members 56 and 57 are provided at the radially inner portions with a plurality of first and second support portions 56a and 57a, which are circumferentially spaced from each other and correspond to the windows 58, respectively. The first and second support portions 56a and 57a are provided for accommodating and supporting the torsion springs 54, which will be described later. The plurality of torsion springs 54 are arranged in the respective windows 58 and between the first and second support portions 56a and 57a. Further, the first and second support portions 56a and 57a restrict an axial movement of the torsion springs 54. The damper mechanism 45 further has torsion springs 61 for achieving a stop torque.

In a region provided with the torsion springs 54, the piston 75 has a radially middle portion 75b of a concave section protruding axially toward the engine, and front cover 11 likewise has a radially middle portion 11d of a corresponding concave section axially protruding toward the engine. Owing to the above structure, the torsion spring 54 can have a sufficiently large coil diameter so that the performance of the torsion springs 54 can be easily improved. Consequently, an operation can be performed in such a manner that the hydraulic torque transmission in the fluid working chamber 6 of the torque converter 1 is utilized only in a start operation, and the lockup device 7 operates after the start.

(3) Operation of Torque Converter

An operation of the torque converter 1 will now be described.

Immediately after the start of the engine, the working fluid is supplied into the torque converter 1 from the first and third ports 18 and 20, and is discharged from the second port 19. The working fluid supplied from the first port 18 through the oil passages 16c and 82 flows radially outward through the first space 59 of the space 8. The working fluid further flows through the axially opposite sides of the frictional coupling portion 74a of the drive plate 74, and finally flows into the fluid working chamber 6.

In this operation, the hydraulic pressure in the first space 59 is higher than that in the second space 60, and the return spring 79 applies a force to the piston 75 so that the piston 75 is located on the turbine side. As shown in FIG. 3, the engagement projections 75d of the piston 75 are in contact with the body 78a of the piston support 78. More specifically, a surface 75g on the turbine side of each engagement projection 75d is in axial contact with a surface 78f on the front cover side of the body 78a. When the lockup is released as described above, the torque transmission between the front cover 11 and the turbine 22 is performed by the hydraulic driving between the impeller 21 and the turbine 22.

Figure 5:
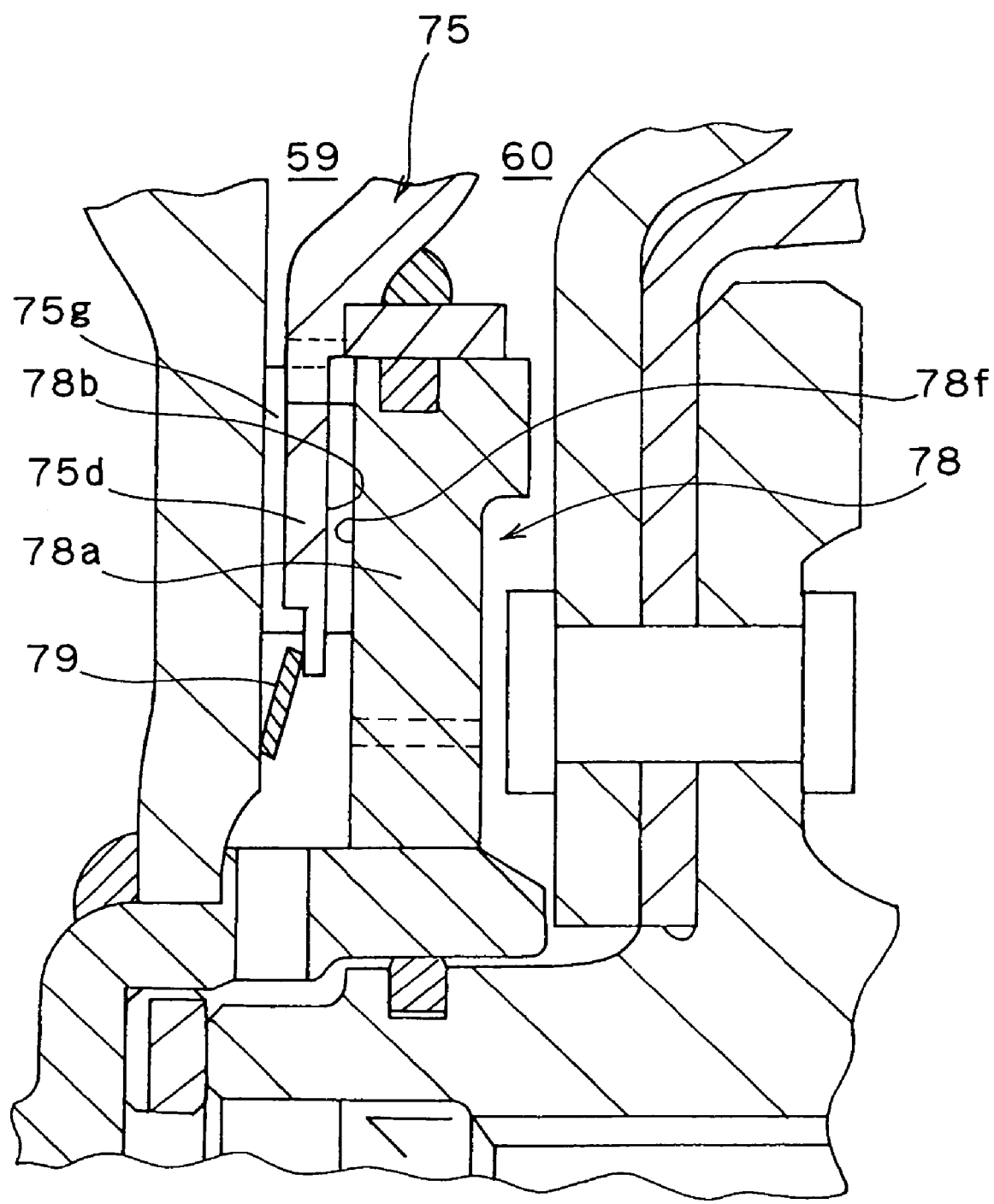
FIG. 5 shows, on an enlarged scale, a portion of the structure in FIG. 1 and illustrates the piston coupling mechanism in a lockup-engaged state.

When the speed ratio of the torque converter 1 rises to achieve a constant rotation speed of the input shaft, the working fluid is discharged from the space 8 through the first port 18. Consequently, the hydraulic pressure in the second space 60 exceeds the hydraulic pressure in the first space 59 to move the piston 75 toward the engine. Thereby, the pressing portion 75a of the piston 75 presses the frictional coupling portion 74a of the drive plate 74 to the friction surface 11b of the front cover 11. In this operation, the piston coupling mechanism 76 rotates the piston 75 together with the front cover 11 so that the drive plate 74 transmits the torque from the front cover 11 to the turbine 22. The torque of the front cover 11 is transmitted from the drive member 52 to the driven member 53 and the turbine 22 via the torsion springs 54. In this manner, the torque of the front cover 11 is directly transmitted to the input shaft (not shown) via the turbine 22. In this operation, torsion springs 54 are compressed in the rotating direction between the drive and driven members 52 and 53 when a relative rotation occurs therebetween. In the above operation, the piston coupling mechanism 76 operates as shown in FIG. 5, and more specifically, the engagement projections 75d of the piston 75 axially move away from the body 78a of the piston support 78. Consequently, the return spring 79 is further compressed. The working fluid in the first space 59 flows radially through the spaces between the base ends of the engagement projections 75d and the spaces between the engagement projections 75d and the body 78a of the piston support 78.

When the working fluid is supplied into the torque converter 1 through the first and third ports 18 and 20, and is discharged through the second port 19, the working fluid supplied from the first port 18 through the oil passages 16c and 82 flows radially outward in the space 59 of the space 8. The working fluid further flows through the axially opposite sides of the frictional coupling portion 74a of the drive plate 74, and finally flows into the fluid working chamber 6. Consequently, the hydraulic pressure in the second space 60 becomes lower than that in the first space 59 so that the piston 75 axially moves toward the turbine. Thereby, the pressing portion 75a of the piston 75 is spaced from the frictional coupling portion 74a, and the frictional coupling portion 74a is spaced from the friction surface 11b of the front cover 11. When the engagement projection 75d comes into axial contact with the surface on the engine side of the body 78a of the piston support 78 as shown in FIG. 3, the piston 75 stops its axial movement.

Because the piston coupling mechanism 76 is arranged radially inside the seal mechanism 81, a large space can be ensured radially outside the seal mechanism 81 so that the damper mechanism 45 can employ the large torsion springs 54. This can lower the rigidity of the torsion springs, and can improve the performance for absorbing the torsional vibrations. Consequently, the lockup coupling can be performed even in a low speed range, or can always be performed.

A structure in which the piston coupling mechanism is arranged radially inside the seal mechanism means that the piston coupling mechanism is not arranged in a space radially outside the seal mechanism.

Because the piston coupling mechanism 76 is formed of the plurality of projections 75d and 78d, the structure can be simplified. In particular, the structure does not require a strap plate, laser beam welding and others. This improves the assembly property, and ensures stable quality. Consequently, costs can be reduced, assembly properties can be improved and the quality can be made uniform. Further, space efficiency is improved, and costs can be reduced.

Because the piston coupling mechanism 76 also serves as the oil passage, the number of parts required can be reduced.

(4) Other Embodiments

The first embodiment has been described with reference to the drawings. However, specific structures are not restricted to those of the foregoing embodiment, and various modifications and variations can be effected without departing from the spirit and scope of the invention.

According to the embodiment already described, the invention is applied to the torque converter. However, the invention may be applied to another hydraulic torque transmission device.

Figure 6:
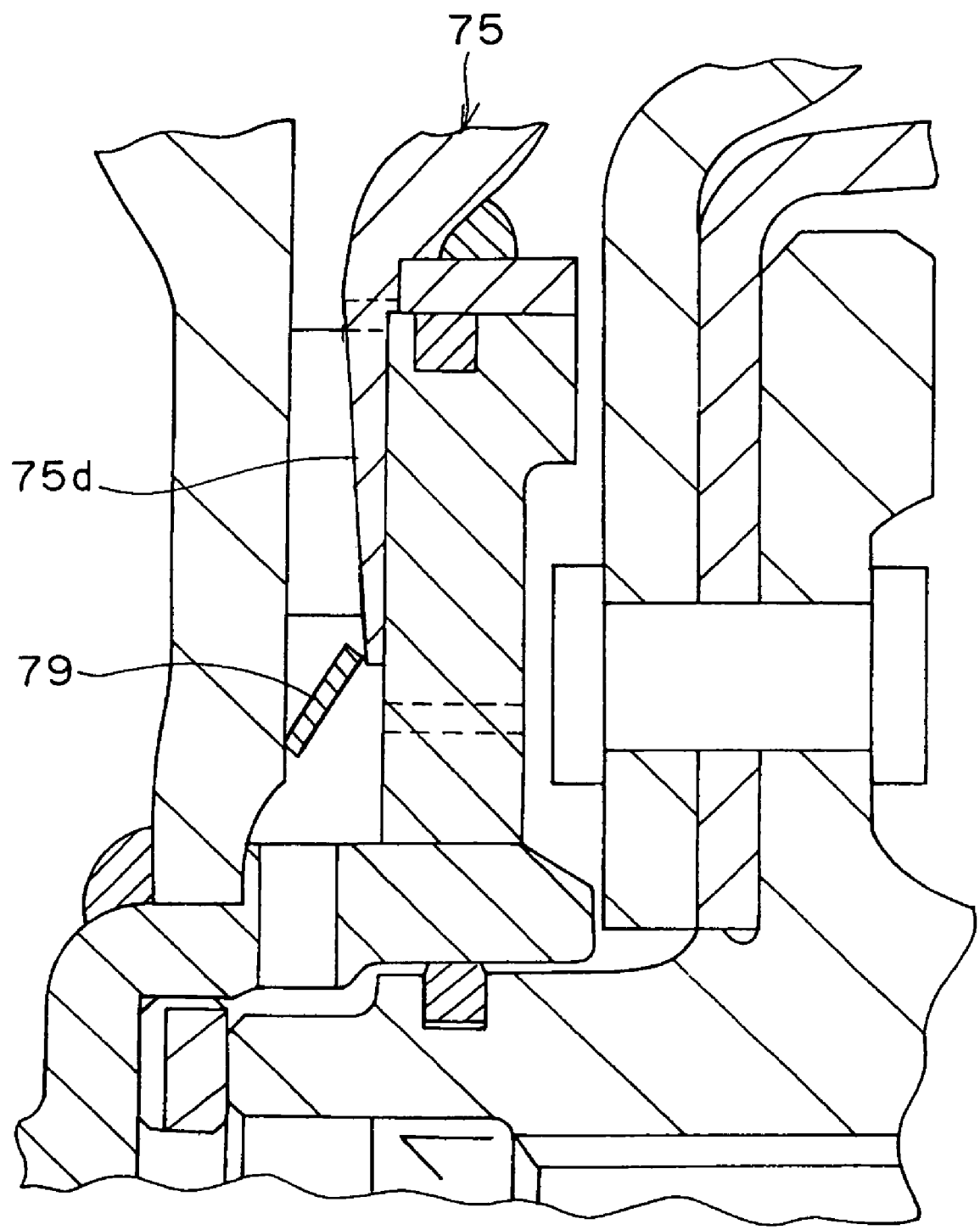
FIG. 6 illustrates the piston coupling mechanism in a modification of the first embodiment.

In a modification of the first embodiment of the invention, as shown in FIG. 6, the surfaces on the front cover side of the engagement projections 75d of the piston 75 may have a tapered form having a section, which converges radially inward. In this case, the working fluid can flow more smoothly in the radially outward direction.

Figure 7:
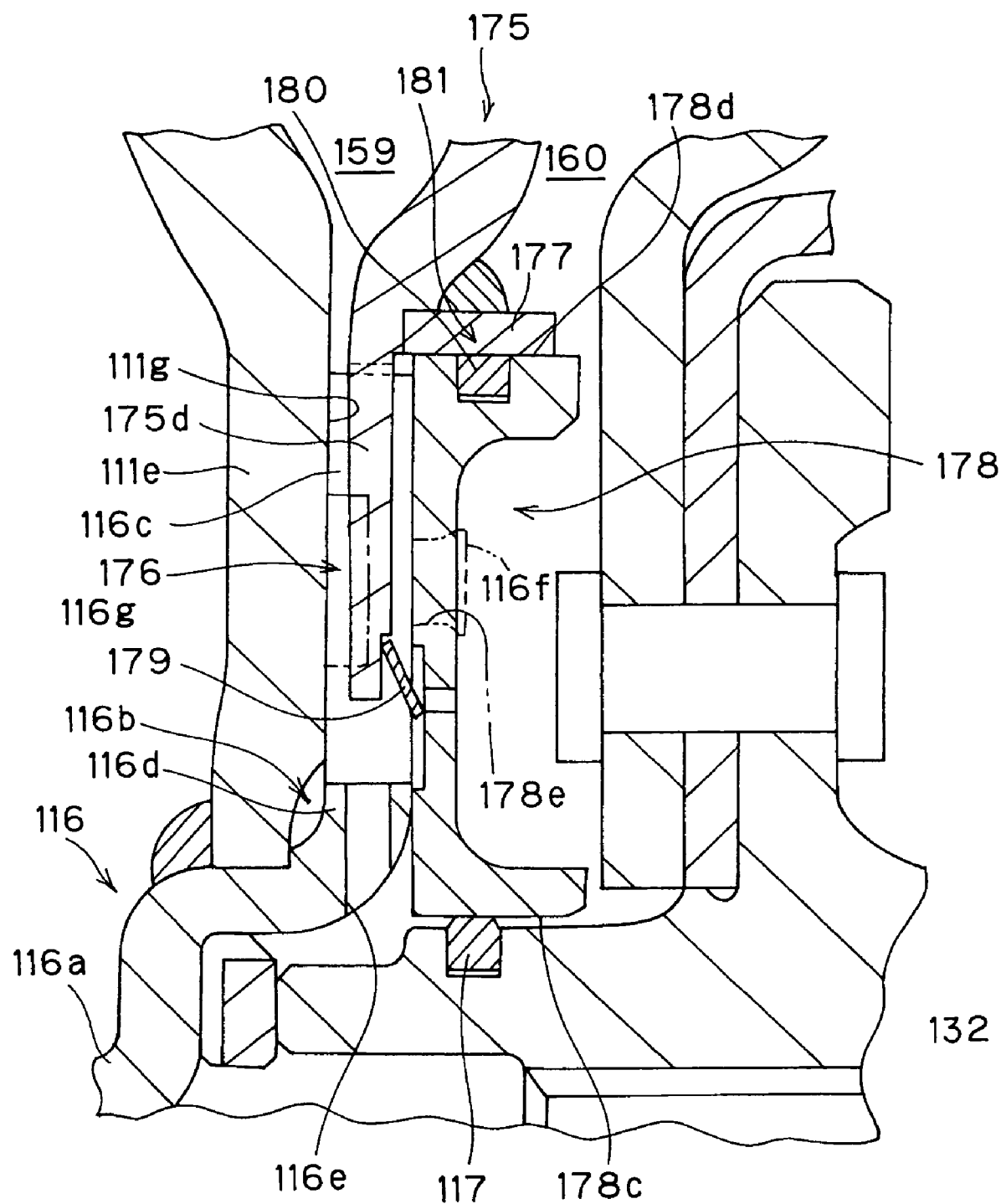
FIG. 7 shows a piston coupling mechanism according to a second embodiment.
Figure 8:
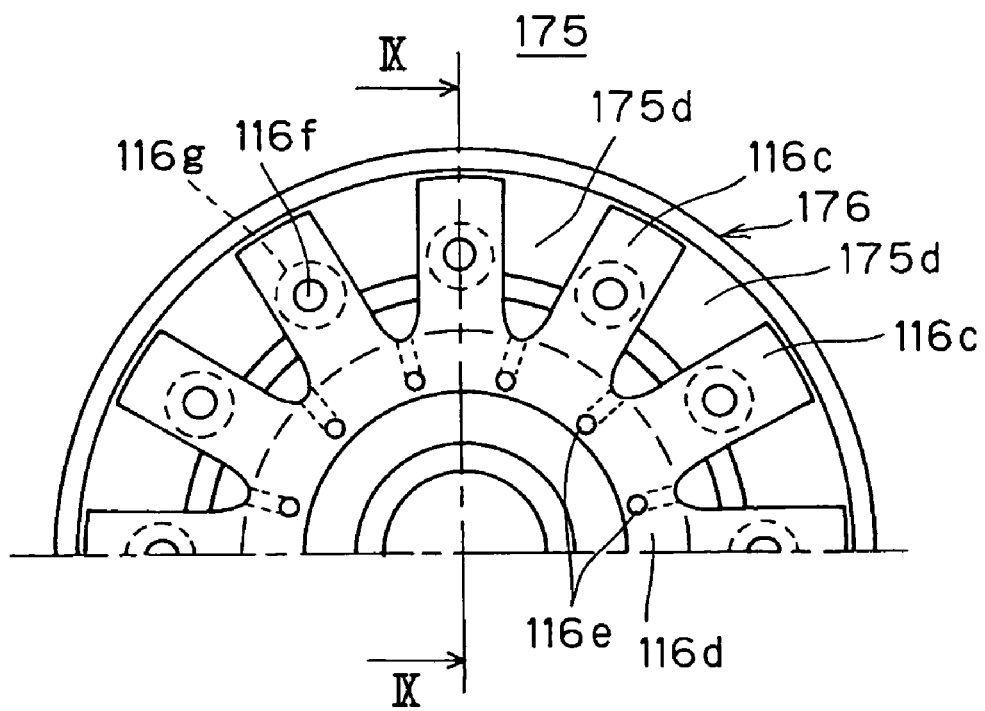
FIG. 8 is a fragmentary plan view of the piston coupling mechanism.
Figure 9:
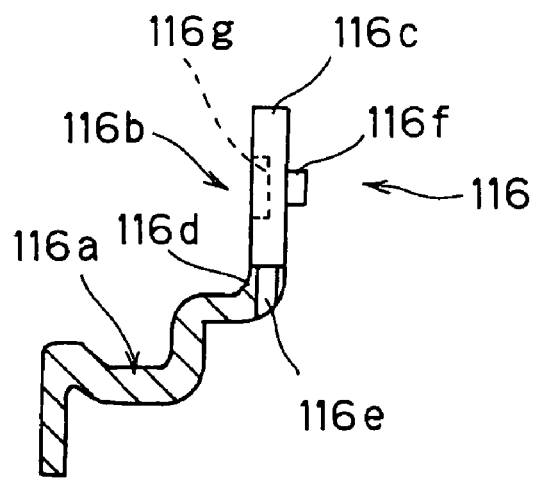
FIG. 9 is a cross section of a center boss taken along line IX—IX in FIG. 8.

A second embodiment of the invention will now be described with reference to FIGS. 7 to 9. The following description will be given only for the piston coupling mechanism.

A piston coupling mechanism 176 functions to couple the piston 175 to the front cover 111 for integral rotation while allowing axial relative movement within a predetermined range. The piston coupling mechanism 176 is primarily formed of a portion of a center boss 116, a portion of the piston 175 and a piston support 178.

The center boss 116 is an axially extending member of a substantially cylindrical form, and is fixed to a radially inner circumferential portion 111e of a front cover 111 by welding or the like. The center boss 116 has a cylindrical portion 116a on the crankshaft side fitted into the central aperture of the crankshaft, and a flange portion 116b extending radially outward from the edge on the turbine side of the cylindrical portion 116a. The flange portion 116b is formed of a plurality of circumferentially spaced radial projections 116c, and an annular portion 116d located between the cylindrical portion 116a and the projections 116c. The projections 116c are in contact with the surface 111g on the turbine-side of the front cover 111.

The piston support 178 is axially spaced from a radially innermost portion 111e of the front cover 111 by a predetermined distance. The piston support 178 is in contact with the surfaces on the turbine side of the projections 116c, and is fixed to the projections 116c by caulked portions 116f. The caulked portions 116f are prepared by axially extruding the projections 116c toward the turbine, and therefore project axially toward the turbine. Thereby, concavities 116g are formed on the front cover side of the engagement projections 175d. The caulked portions 116f axially extend through holes 178e formed in the piston support 178, and the free end portions are caulked. Instead of the above half-blanking caulking, the piston support 178 and the projections 116c may be fixed by spot welding.

The piston 175 is further provided at its radially inner periphery with a plurality of engagement projections 175d extending radially inward. The engagement projections 175d are engaged with the projections 116c, and thereby the piston 175 is non-rotatable and axially movable with respect to the center boss 116 and therefore to the front cover 111.

When the engagement projections 175d come into contact with the piston support 178, the piston 175 stops its axial movement toward the turbine side. Thus, the piston support 178 functions as a stop against the axial movement of the piston 175.

A cylindrical member 177 is fixed to a portion of the piston 175 near its radially inner periphery. The cylindrical member 177 extends axially toward the transmission, and a radially inner circumferential surface 177a thereof is in contact with a radially outer circumferential surface 178d of the piston support 178. A seal ring 180 is arranged on the radially outer circumferential surface 178d of a body 178a of the piston support 178 for preventing flow of the working fluid between first and second spaces 159 and 160 defined by the piston 175 in a space 108. According to the above structure, a seal mechanism 181 is formed between the piston support 178 and the cylindrical member 177.

A radially inner circumferential surface 178c of the piston support 178 is in contact with a seal member 117 arranged on a turbine hub 132. As described above, the seal mechanisms are arranged on the radially inner and outer peripheral portions of the piston support 178 for preventing the movement of the working fluid between the axially opposite spaces.

A spring 179 is an elastic member for applying a biasing force to the piston 175 to move it toward the front cover 111. The spring 179 is arranged radially inside the piston coupling mechanism 176 and between the projections 116c. The spring 179 improves the operational response of the lockup clutch.

The above embodiment can achieve effects similar to those of the previous embodiment.

As described above, the piston coupling mechanism 176 is formed by the engagement of the projections provided by utilizing the oil passage of the piston support 178, and is arranged radially inside the seal mechanism 181. Thus, the piston coupling mechanism 176 does not have a portion arranged radially outside the seal mechanism 181. Accordingly, any member other than the piston 175 is not arranged in the radial position of the torsion springs of the damper mechanism. Consequently, a large space can be ensured for the torsion springs, and the torsion springs can have a large coil diameter.

The piston support 178 described above functions to stop the axial movement of the piston 175 toward the turbine, functions to radially position the piston 175 and functions to form the seal mechanism 181 with respect to the piston 175.

The center boss 116 described above functions to transmit the torque to the piston 175 by engagement with the piston 175, and functions to ensure the oil passage between the front cover 111 and the center boss 116. Since the flange portion 116b of the center boss 116 forms a part of the piston coupling mechanism 176 as described above, the required strength of the piston support 178 can be reduced. Thus, the piston support 178 is not required to have a torque transmission function, and the required functions thereof are restricted to the sealing between the radially inner and outer circumferential surfaces, centering of the piston and others. Consequently, the axial thickness of the piston support 178 can be smaller than that in the foregoing first embodiment. Further, the piston support 178 can have a simple structure. Thus, the piston support 178 has a thin and light structure, and thus the cost and weight can be reduced.

The terms of degree such as "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

This application claims priority to Japanese Patent Application No. 2004-084860. The entire disclosure of Japanese Patent Application No. 2004-084860 is hereby incorporated herein by reference.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents. Thus, the scope of the invention is not limited to the disclosed embodiments.

What is claimed is:

1. A lockup device for use in a hydraulic torque transmission device, the lockup device including a front cover having a friction surface, an impeller fixed to the front cover to define a fluid chamber filled with a working fluid, and a turbine arranged in the fluid chamber and opposed to the impeller, the lockup device comprising:
   a friction plate having a frictional coupling portion adjacent to the friction surface, and being configured to provide torque to the turbine;
   a disk-like piston being arranged between the front cover and the turbine, said piston having a pressing portion arranged on a side of said frictional coupling portion remote from the friction surface, and being axially movable in response to a change in hydraulic pressure;
   a piston coupling mechanism being configured to couple unrotatably and axially movably said piston to the front cover;
   a seal mechanism being configured to seal a radially inside portion of said piston on a side of said piston axially opposite the front cover, said piston coupling mechanism being arranged radially inside said seal mechanism and axially between said seal mechanism and the front cover; and
   a damper mechanism being arranged in an axial space between said the front cover and the turbine, and located radially between said friction plate and said seal mechanism.

2. The lockup device according to claim 1, wherein said piston coupling mechanism has a plurality of circumferentially spaced projections engaged with each other.

3. The lockup device according to claim 1, wherein said piston coupling mechanism forms a working fluid moving passage that opens into a space between the front cover and said piston.

4. The lockup device according to claim 1, wherein said piston coupling mechanism is formed of a disk-like engagement member that rotates together with the front cover, said piston coupling mechanism provided with a plurality of circumferentially spaced projections, and a plurality of engagement projections projecting from a radially inner periphery of said piston that engages with said plurality of projections.

5. The lockup device according to claim 4, wherein said engagement member is formed of a disk-like body located in a position axially shifted from a radially inner portion of the front cover toward the turbine, and said projection axially projects from said body toward the front cover.

6. The lockup device according to claim 4, wherein said seal mechanism is arranged on a radially outer circumferential surface of said engagement member.

7. The lockup device according to claim 6, wherein said seal mechanism has a cylindrical member fixed to a radially inner portion of said piston, and is axially slidable on a radially outer circumferential surface of said support member.

8. The lockup device according to claim 1, further comprising
   a center boss fixed to a radially inner periphery of the front cover,
   wherein said piston coupling mechanism is formed of a plurality of circumferentially spaced projections arranged on said center boss, and a plurality of engagement projections projecting from a radially inner periphery of said piston engaged with said plurality of projections.

9. The lockup device according to claim 8, wherein said plurality of projections is in contact with a surface on a turbine side of a radially inner portion of the front cover.

10. The lockup device according to claim 8, wherein a radially outer portion of said center boss is provided at a portion radially inside said plurality of projections with a working fluid supply passage that opens into a portion between said plurality of projections.

11. The lockup device according to claim 8, wherein said piston coupling mechanism further has a support member that radially supports said piston.

12. The lockup device according to claim 11, wherein said support member is axially located on the turbine side with respect to said plurality of projections.

13. The lockup device according to claim 12, wherein said support member is fixed to said plurality of projections.

14. The lockup device according to claim 11, wherein said seal mechanism is arranged on a radially outer circumferential surface of said support member.

15. The lockup device according to claim 14, wherein said seal mechanism has a cylindrical portion fixed to a radially inner portion of said piston and is axially slidable with respect to a radially outer circumferential surface of said support member.

16. A lockup device for use in a hydraulic torque transmission device, the lockup device including a front cover having a friction surface, an impeller fixed to the front cover to define a fluid chamber filled with a working fluid, and a turbine arranged in the fluid chamber and opposed to the impeller, the lockup device comprising:
   a friction plate having a frictional coupling portion adjacent to the friction surface, and being configured to provide torque to the turbine;
   a disk-like piston being arranged between the front cover and the turbine, said piston having a pressing portion arranged on a side of said frictional coupling portion remote from the friction surface, and being axially movable according to a change in hydraulic pressure;
   a piston coupling mechanism being configured to couple unrotatably and axially movably said piston to the front cover, said piston coupling mechanism having a plurality of circumferentially space projections being configured to engage with each other;
   a seal mechanism being configured to seal a radially inside portion of said piston on a side of said piston axially opposite the front cover, said piston coupling mechanism being arranged axially between said seal mechanism and the front cover; and
   a damper mechanism being arranged in an axial space between the front cover and the turbine, and located radially between said friction plate and said seal mechanism.

17. The lockup device according to claim 16, wherein said piston coupling mechanism forms a working fluid moving passage which opens into a space between the front cover and said piston.

18. The lockup device according to claim 16, wherein said piston coupling mechanism is formed of a disk-like engagement member that rotates together with the front cover and has one of said circumferentially spaced projections, and another of said circumferentially spaced projections that projects radially inward from a radially inner periphery of said piston.

19. The lockup device according to claim 18, wherein said engagement member is formed of a disk-like body located in a position axially shifted from a radially inner portion of the front cover toward the turbine, and said projection axially projects from said body toward the front cover.

20. The lockup device according to claim 16, further comprising
a center boss fixed to a radially inner periphery of the front cover,
wherein said piston coupling mechanism is formed of one of said plurality of circumferentially spaced projections provided on said center boss, and another of said plurality of circumferentially spaced projections that projects radially inward from a radially inner periphery of said piston.

21. The lockup device according to claim 20, wherein said plurality of projections of said center boss is in contact with a surface on a turbine side of a radially inner portion of the front cover.

22. A hydraulic torque transmission device comprising:
a front cover having a friction surface;
an impeller being fixed to said front cover to define a fluid chamber filled with a working fluid;
a turbine being arranged in said fluid chamber; and
a lockup device having
a friction plate having a frictional coupling portion adjacent to said friction surface, and being configured to provide torque to said turbine,
a disk-like piston being arranged between said front cover and said turbine, said piston having a pressing portion arranged on a side of said frictional coupling portion remote from said friction surface, and being axially movable in response to a change in hydraulic pressure,
a piston coupling mechanism being configured to couple unrotatably and axially movably said piston to said front cover, said piston coupling mechanism being configured to contact said front cover,
a seal mechanism being configured to seal a radially inside portion of said piston on a side of said piston axially opposite said front cover, and
a damper mechanism being arranged in an axial apace between said front cover and said turbine, and located radially between said friction plate and said seal mechanism.

* * * * *